United States Patent
Tani et al.

(10) Patent No.: US 12,318,913 B2
(45) Date of Patent: Jun. 3, 2025

(54) CONSTRUCTION ROBOT

(71) Applicant: Shimizu Corporation, Tokyo (JP)

(72) Inventors: Taku Tani, Tokyo (JP); Syunsuke Igarashi, Tokyo (JP)

(73) Assignee: SHIMIZU CORPORATION, Tokyo (JP)

( * ) Notice: Subject to any disclaimer, the term of this patent is extended or adjusted under 35 U.S.C. 154(b) by 325 days.

(21) Appl. No.: 17/765,445

(22) PCT Filed: Jul. 27, 2020

(86) PCT No.: PCT/JP2020/028753
§ 371 (c)(1),
(2) Date: Mar. 31, 2022

(87) PCT Pub. No.: WO2021/070454
PCT Pub. Date: Apr. 15, 2021

(65) Prior Publication Data
US 2022/0379489 A1   Dec. 1, 2022

(30) Foreign Application Priority Data
Oct. 10, 2019   (JP) .................................. 2019-186518

(51) Int. Cl.
*B25J 13/08* (2006.01)
*B25J 9/16* (2006.01)
(Continued)

(52) U.S. Cl.
CPC .............. *B25J 13/08* (2013.01); *B25J 9/1612* (2013.01); *E04G 21/16* (2013.01)

(58) Field of Classification Search
CPC ........ B25J 13/08; B25J 9/1612; B25J 19/022; B25J 19/023; B25J 17/0225; B25J 9/00;
(Continued)

(56) References Cited

U.S. PATENT DOCUMENTS

| | | | |
|---|---|---|---|
| 5,284,000 A | * | 2/1994 | Milne ..................... E04G 21/22 52/749.14 |
| 7,328,630 B2 | * | 2/2008 | Wright ..................... B25J 15/04 73/866.5 |

(Continued)

FOREIGN PATENT DOCUMENTS

| | | | |
|---|---|---|---|
| CN | 208629073 U | * | 3/2019 |
| JP | 7-109838 A | | 4/1995 |

(Continued)

OTHER PUBLICATIONS

International Search Report and Written Opinion mailed on Sep. 24, 2020, received for PCT Application PCT/JP2020/028753, Filed on Jul. 27, 2020, 9 pages including English Translation.

*Primary Examiner* — Adam R Mott
*Assistant Examiner* — Byron Xavier Kasper
(74) *Attorney, Agent, or Firm* — XSENSUS LLP

(57) ABSTRACT

A construction robot for mounting a member with a changeable height on a body at a predetermined height includes: a manipulator; an end effector provided at a distal end of the manipulator; a recognizing unit configured to recognize positions of the member and the body; and a measuring unit configured to measure a positional relation between the member and the body. The end effector includes a holding unit configured to hold the member in a releasable manner, and a height adjusting unit configured to adjust a height of the member by moving the member in contact with the body in a direction moving closer to or in a direction moving away from the body.

10 Claims, 4 Drawing Sheets

(51) Int. Cl.
  *B25J 17/02*   (2006.01)
  *B25J 19/02*   (2006.01)
  *E04F 15/024*  (2006.01)
  *E04G 21/16*   (2006.01)

(58) Field of Classification Search
  CPC .......... B25J 9/16; B25J 9/1005; B25J 9/1687;
           E04G 21/16; E04F 15/02464
  See application file for complete search history.

(56) References Cited

U.S. PATENT DOCUMENTS

| | | | |
|---|---|---|---|
| 11,413,064 B2* | 8/2022 | Waterbury | A61B 17/0281 |
| 2015/0298321 A1* | 10/2015 | Gross | B65G 11/023 |
| | | | 422/67 |
| 2015/0336272 A1* | 11/2015 | Drew | E04F 21/1872 |
| | | | 414/737 |
| 2016/0279807 A1* | 9/2016 | Cossette | B23K 9/00 |
| 2017/0022721 A1* | 1/2017 | Komura | E04F 21/20 |
| 2018/0172121 A1* | 6/2018 | Potter | B25J 17/0241 |
| 2018/0354136 A1* | 12/2018 | Carlisle | B25J 13/085 |

FOREIGN PATENT DOCUMENTS

| | | | | |
|---|---|---|---|---|
| JP | 5368743 B2 * | 12/2013 | | |
| JP | 2017-110466 A | 6/2017 | | |
| JP | 2018178473 A * | 11/2018 | | |
| KR | 2016066566 A * | 6/2016 | .............. | G01C 5/00 |
| WO | 2008/047872 A1 | 4/2008 | | |

* cited by examiner

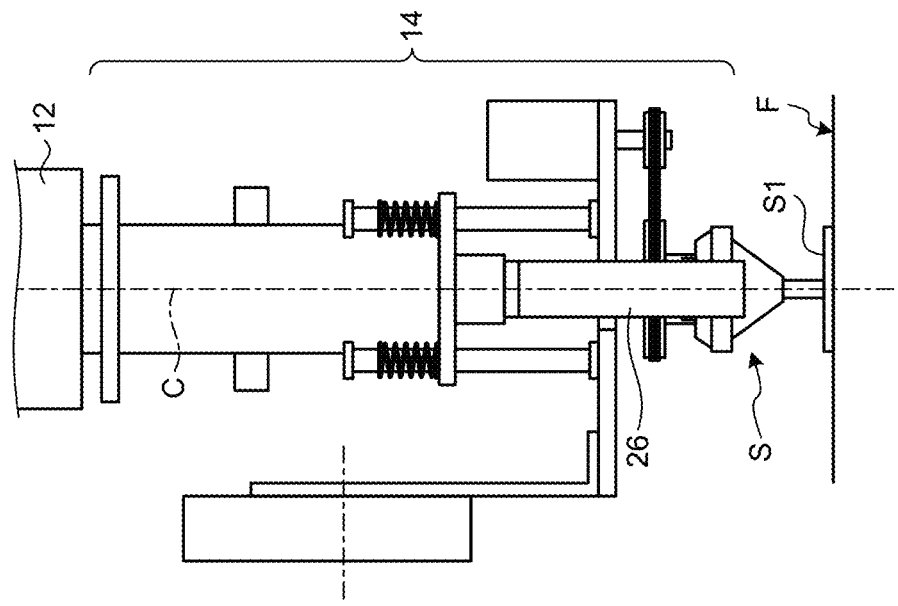
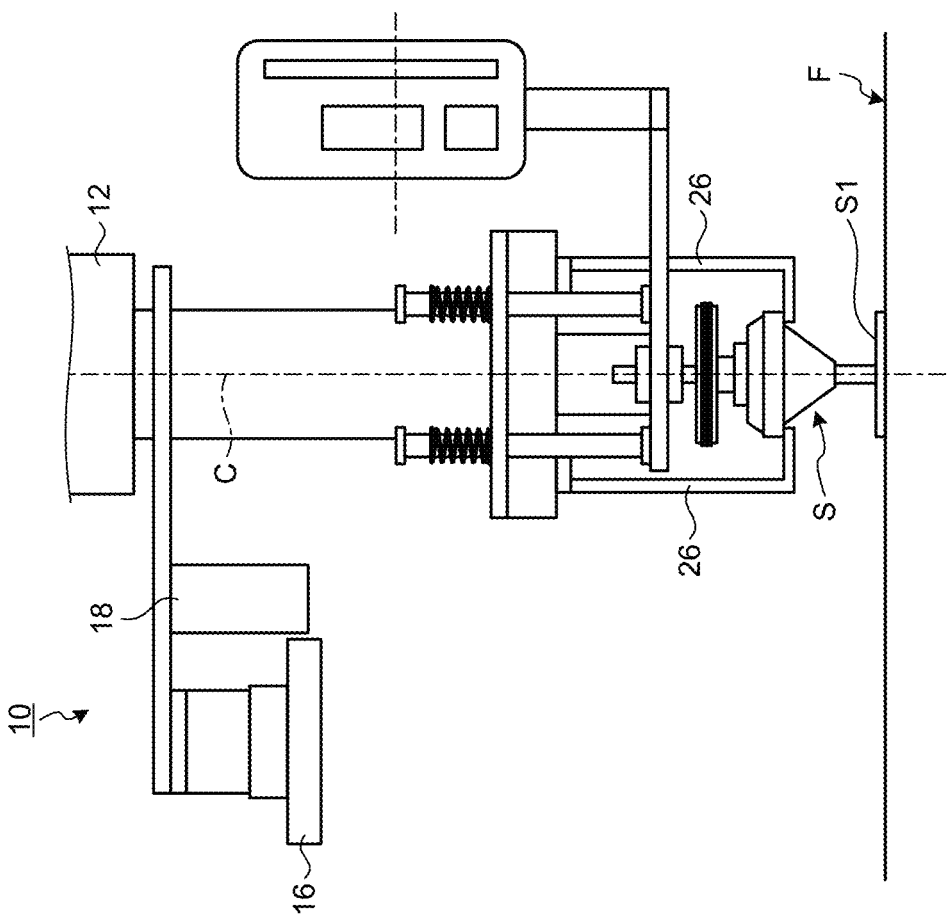
FIG.2

FIG.3
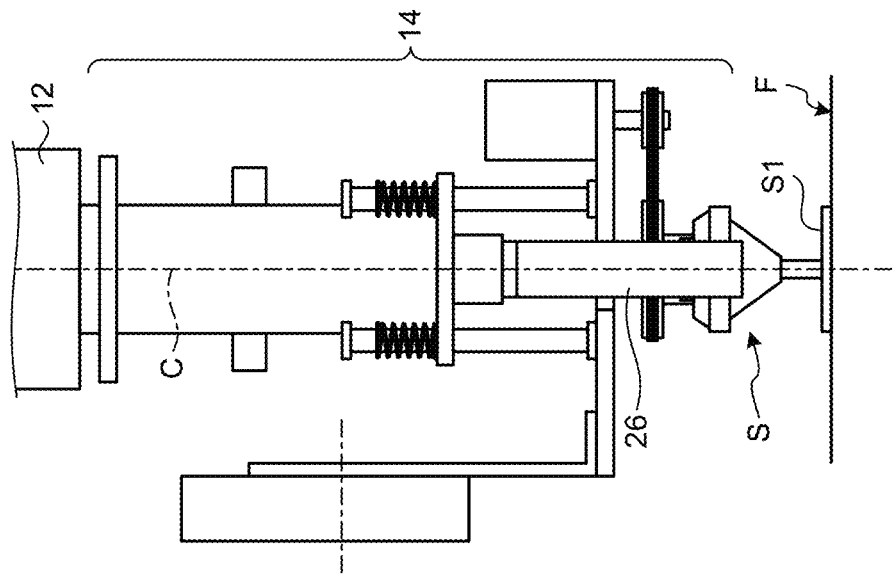
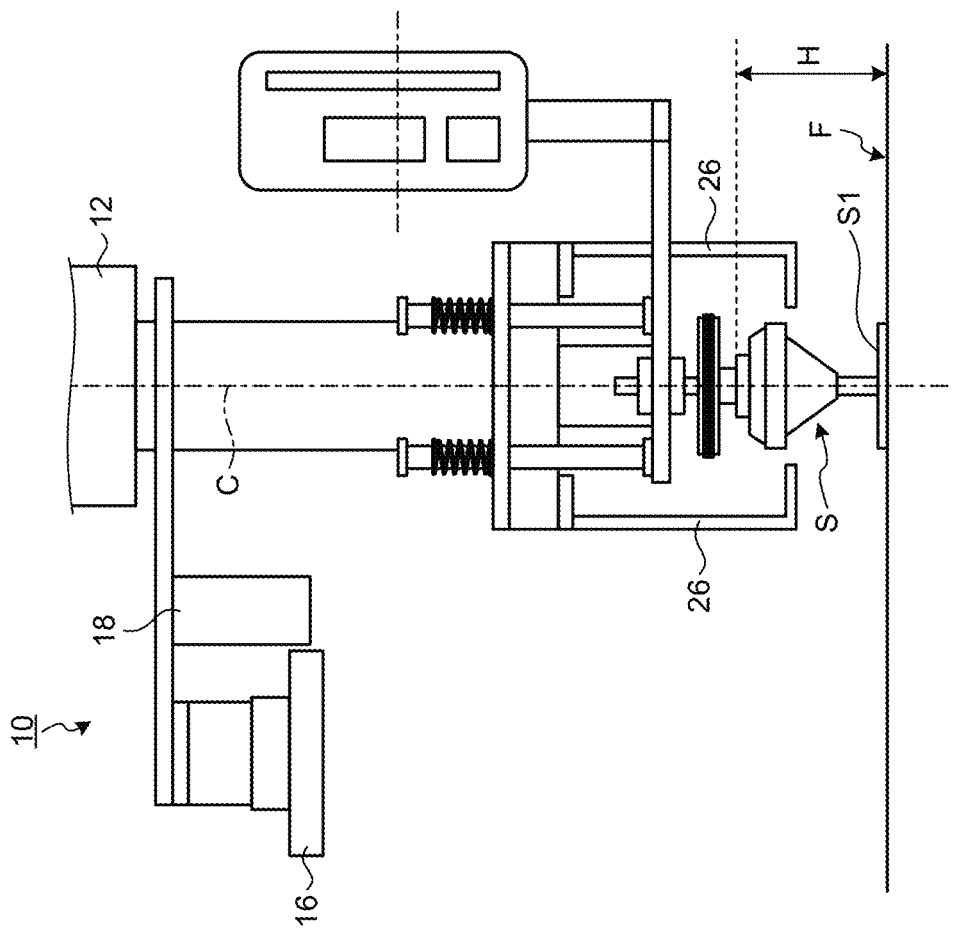

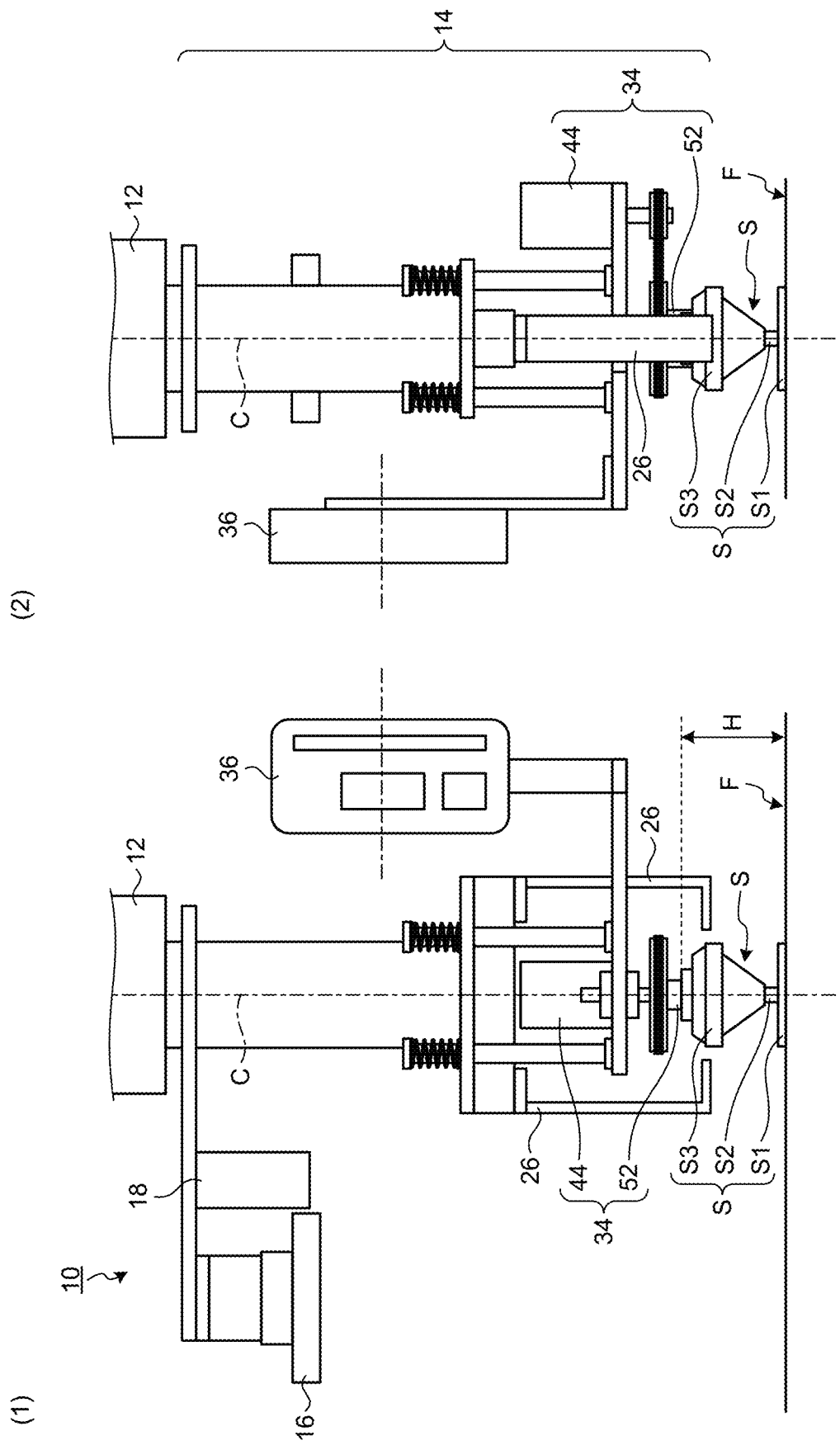

CONSTRUCTION ROBOT

CROSS-REFERENCE TO RELATED APPLICATIONS

The present application is based on PCT filing PCT/JP2020/028753, filed Jul. 27, 2020, which claims priority to JP 2019-186518, filed Oct. 10, 2019, the entire contents of each are incorporated herein by reference.

FIELD

The present invention relates to a construction robot for achieving labor and manpower saving in a construction work.

BACKGROUND

As part of conventional construction of an interior floor of a building, a raised floor (hereinafter, sometimes referred to as a double floor) has been formed by installing a floor above another, to secure a space that can be used for network cabling, ventilation, and the like, between the upper and the lower floor, and installing supports and panels for the double floor (for example, refer to Patent Literature 1). A worker carries out such an installation work manually by crouching down, and, in order to deal with the unevenness of the concrete floor, adjusts the height using a rotating laser level installed in the construction site as a reference to ensure horizontality and flatness. Generally, there are a large number of double floor installations, and it is necessary to repeat the process of transporting the materials to the installation site, mounting the materials, and adjusting the height, a large number of times.

To address this issue, the applicant of the present patent application has disclosed a construction robot, as described in Patent Literature 2. The construction robot disclosed in Patent Literature 2 is a robot used for mounting a member on a body, the robot including: a base; one or more manipulators that are provided to the base; an end effector that is removably provided to a distal end of the manipulator; a recognizing unit that is provided to the distal end of the manipulator or to the end effector, and that recognizes the types and the positions of the member and the body; and a measuring unit that measures a positional relation between the distal end of the manipulator or the end effector and the body. The manipulator includes a movement control unit that moves the distal end of the manipulator closer to a preset position of the body, and the end effector includes a member holding unit for holding the member, a mounting operating unit for making an operation of mounting the member held by the member holding unit on the body, and a monitoring unit for monitoring the condition of the mounting.

CITATION LIST

Patent Literature

Patent Literature 1: Japanese Patent Application Laid-open No. 2018-178473
Patent Literature 2: Japanese Patent Application Laid-open No. 2017-110466

SUMMARY

Technical Problem

When the construction robot disclosed in Patent Literature 2 is to be used in the construction of a double floor, possible applications of the construction robot include those in a task of fixing a support held by the end effector to the floor using adhesive while adjusting the height of the support, and a task of mounting a double floor panel on the support using the end effector. Among these tasks, to improve the efficiency of the task of the support installation, it is necessary to perform the task in a short time, by installing a support and to adjust the height of the support based on the unevenness of the concrete floor simultaneously. Therefore, there has been a demand for a technology making it possible to install a support and to adjust the height of the support simultaneously.

The present invention is made in consideration of the above, and an object of the present invention is to provide a construction robot that is capable of installing a support and to adjust the height of the support simultaneously.

Solution to Problem

To solve the above-described problem and achieve the object, a construction robot according to the present invention for mounting a member with a changeable height on a body at a predetermined height includes: a manipulator; an end effector provided at a distal end of the manipulator; a recognizing unit configured to recognize positions of the member and the body; and a measuring unit configured to measure a positional relation between the member and the body, wherein the end effector includes a holding unit configured to hold the member in a releasable manner, and a height adjusting unit configured to adjust a height of the member by moving the member in contact with the body in a direction moving closer to or in a direction moving away from the body.

Moreover, in the above-described construction robot according to the present invention, the member is a support including: a screw shaft positioned on a side of the body; and a seat screwed onto the screw shaft and configured to move in a direction along the screw shaft, and the height adjusting unit is configured to adjust a height of the support by rotating the seat of the support about the screw shaft.

Moreover, in the above-described construction robot according to the present invention, the height adjusting unit includes: a sliding mechanism provided slidably along an axial direction with respect to the holding unit; a rotating mechanism configured to move integrally with the sliding mechanism, and rotate the seat of the support; and a recognizing mechanism configured to move integrally with the sliding mechanism, recognize the height of the support, and adjust the height of the support by rotating the seat of the support based on the height recognized by the recognizing mechanism.

Advantageous Effects of Invention

Regarding a construction robot according to the present invention, the construction robot is a construction robot for mounting a member with a changeable height on a body at a predetermined height, the construction robot including: a manipulator, an end effector that is provided to a distal end of the manipulator, a recognizing unit that recognizes positions of the member and the body, and a measuring unit that measures a positional relation between the member and the body, in which the end effector includes a holding unit that holds the member in a releasable manner, and a height adjusting unit that adjusts a height of the member by moving the member having been brought into contact with the body in a direction moving closer to or in a direction moving away from the body. Thus, an advantageous effect is exerted in which it is possible to install the member such as a support and to adjust the height of the member simultaneously.

Furthermore, regarding another construction robot according to the present invention, the member is a support including a screw shaft that is positioned on a side of the body, and a seat that is screwed onto the screw shaft and is movable in a direction along the screw shaft, and the height adjusting unit adjusts a height of the support by rotating the seat of the support about the screw shaft. Thus, an advantageous effect is exerted in which it is possible to install the support and to adjust the height of the support simultaneously.

Furthermore, regarding another construction robot according to the present invention, the height adjusting unit includes a sliding mechanism that is provided slidably along an axial direction with respect to the holding unit, a rotating mechanism that is movable integrally with the sliding mechanism and configured to rotate the seat of the support, and a recognizing mechanism that is movable integrally with the sliding mechanism and that recognizes the height of the support, and the height adjusting unit adjusts the height of the support by rotating the seat of the support based on the height recognized by the recognizing mechanism. Thus, an advantageous effect is exerted in which it is possible to install the support and to adjust the height of the support simultaneously, and therefore, it is possible to carry out the installation efficiently, advantageously.

BRIEF DESCRIPTION OF DRAWINGS

FIG. 2 is a schematic illustrating a first installation step according to the embodiment, where (1) is a front view, and (2) is a side view.

FIG. 3 is a schematic illustrating a second installation step according to the embodiment, where (1) is a front view, and (2) is a side view.

FIG. 4 is a schematic illustrating a third installation step according to the embodiment, where (1) is a front view, and (2) is a side view.

DESCRIPTION OF EMBODIMENTS

Figure 1:
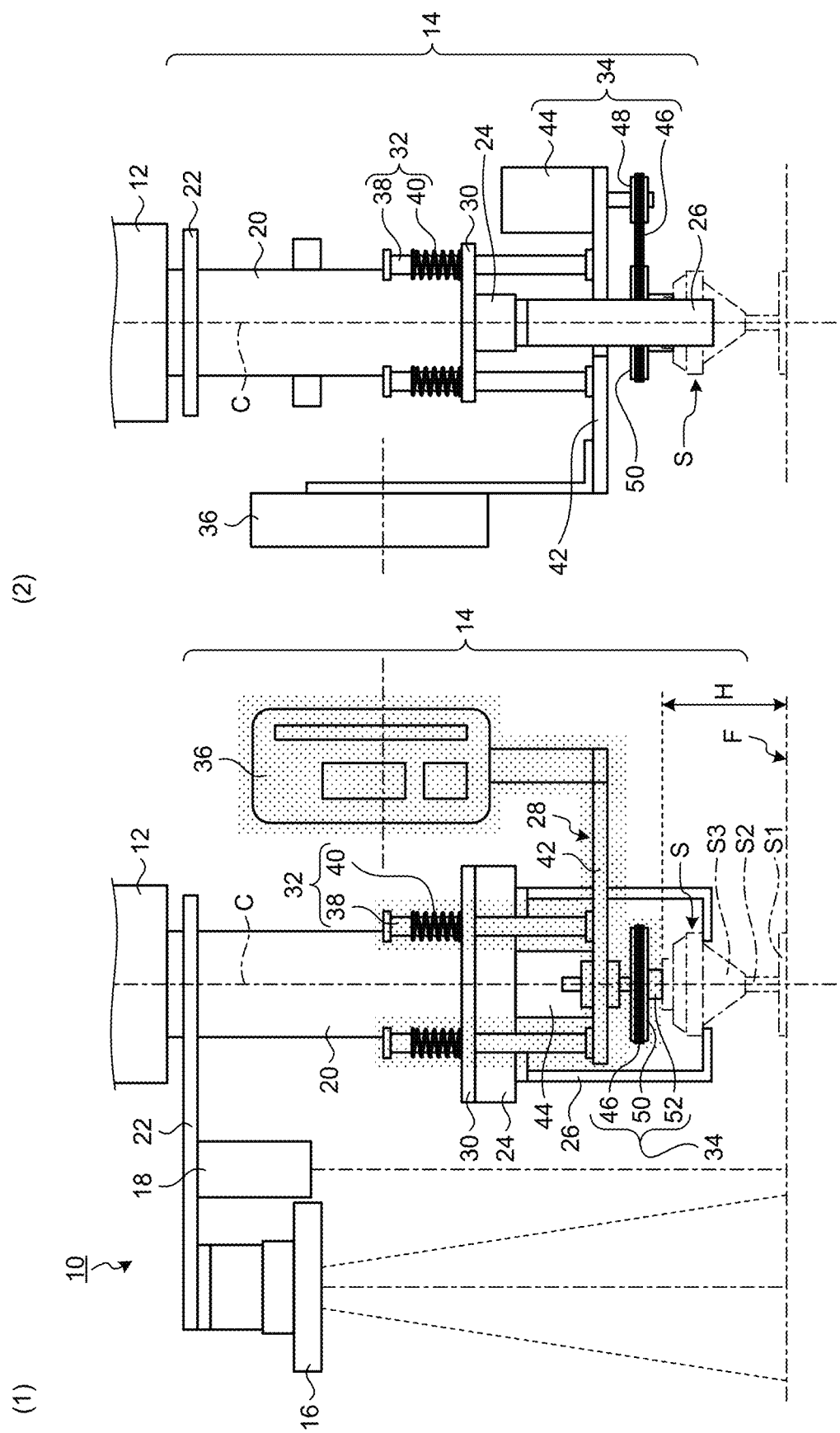
FIG. 1 is a schematic illustrating an embodiment of a construction robot according to the present invention, where (1) is a front view, and (2) is a side view.

An embodiment of the construction robot according to the present invention will now be explained in detail with reference to the drawings. This embodiment is, however, not intended to limit the scope of the present invention.

As illustrated in FIG. 1, a construction robot 10 according to the embodiment is used for mounting a support S (a member with a changeable height) for a double floor, on a concrete floor F (body) at a predetermined height. This construction robot 10 includes a manipulator 12, a support installing unit 14 (end effector) provided to a distal end of the manipulator 12, a camera 16 (recognizing unit), and a laser distance sensor 18 (measuring unit). The manipulator 12 is a robot arm for handling the support installing unit 14.

The support S has a base plate S1 that is brought into contact with the floor F, a screw shaft S2 (height adjustment screw) that is provided upright to the base plate S1, and a seat S3 that is screwed onto the screw shaft S2. By rotating the seat S3 about the screw shaft S2, it is possible to move the seat S3 in a direction along the screw shaft S2, and to adjust the height H of the support S.

The camera 16 and the laser distance sensor 18 are mounted on a sensor base 22 provided laterally in a manner overhanging from a base portion 20 of the support installing unit 14, and the axes of the camera and the sensor are directed to a distal end side in the axial direction C of the support installing unit 14. The camera 16 acquires an image at a given time interval. By causing a control unit not illustrated to apply an analyzing process to the acquired image, it is possible to recognize the support S and a standard marking (position) on the floor F. The laser distance sensor 18 is configured to measure the height H of the support and the floor level with a laser beam. With this laser distance sensor 18, it is possible to understand the positional relation between the support S and the floor F.

The support installing unit 14 includes a support holding cylinder 24, a support holding unit 26, and a support height adjusting unit 28.

The support holding cylinder 24 is provided on a distal end flange 30 of the base portion 20, and includes a cylinder that is extendable and contractible in a direction perpendicular to the axial direction C. Extending and contracting operations of the support holding cylinder 24 are controlled by the control unit not illustrated.

The support holding unit 26 is a holding unit that holds the seat S3 of the support S in a releasable manner, and includes L-shaped members extending from respective ends of the support holding cylinder 24 toward the distal end side in the axial direction C and bending inwards, in a front view. When the support holding cylinder 24 contracts, the claws of the support holding unit 26, the claws being bent inwards, move in the directions approaching each other, and go under the respective edges of the seat S3. In this manner, it is possible to hold the support S. By contrast, when the support holding cylinder 24 extends, the claws move in the directions separating from each other, and become separated from the respective edges of the seat S3. In this manner, it is possible to release the support S.

The support height adjusting unit 28 is a height adjusting unit for adjusting the height H of the support S by moving the support S brought into contact with the floor F in a direction moving closer to the floor F or a direction moving away from the floor F, and includes sliding mechanisms 32, a support rotating mechanism 34, and a rotating laser level light receiver 36.

The sliding mechanisms 32 are provided at four points around the base portion 20, on the distal end flange 30 of the base portion 20. Each of the sliding mechanisms 32 includes a sliding pole 38 that is positioned in a manner passing through the distal end flange 30 and in a slidable manner with respect to the distal end flange 30 in the axial direction C, and a coil spring 40 that is wound around the sliding pole 38 on the side of the base portion 20. The coil spring 40 is positioned between the distal end flange 30 and one end of the sliding pole 38 on the side of the base portion 20, and is provided in a manner capable of applying a biasing force in the direction separating the one end of the sliding pole 38 from the distal end flange 30. To the other end of the sliding pole 38, a height adjustment plate 42 is fixed. Because the support height adjusting unit 28 is connected to the base portion 20 with the sliding poles 38 therebetween, the support height adjusting unit 28 moves freely only in the axial direction C by sliding with its own weight, and follows the movement of the support S with a changing height H.

The support rotating mechanism 34 is a rotating mechanism that is movable integrally with the sliding mechanisms 32, and that is configured to rotate the seat S3 of the support S. This support rotating mechanism 34 is provided to the height adjustment plate 42, and includes a support rotating servo motor 44, a belt 46, pullies 48, 50, and a rotor 52. The output shaft of the support rotating servo motor 44 is coupled to the pulley 48, and the belt 46 is wound around the pullies 48, 50. The pulley 50 is coupled to the rotor 52. The rotor 52 is provided coaxially with the axial direction C, and is engageable with an end of the seat S3 of the support S. By causing the control unit not illustrated to drive the support rotating servo motor 44 and to rotate the seat S3 of the support S about the screw shaft S2 via the belt 46, the pullies 48, 50, and the rotor 52, it is possible to adjust the support height H. The support height adjusting unit 28 can also follow a change in the height H of the support, the change caused by the support rotating mechanism 34.

The rotating laser level light receiver 36 is movable integrally with the sliding mechanism 32, and implements a recognizing mechanism for recognizing the support height H. This rotating laser level light receiver 36 is provided on the height adjustment plate 42. This rotating laser level light receiver 36 receives a laser beam from a rotating laser level, not illustrated, that is installed in the construction site, and detects the support height H in real-time, using the laser beam as a reference. The operation of the support rotating servo motor 44 is controlled by the control unit not illustrated, based on the height H detected by the rotating laser level light receiver 36. The control unit drives the support rotating servo motor 44 and rotates the seat S3 of the support S based on the height H detected by the rotating laser level light receiver 36 so as to adjust the support height H to a preset support installation height.

Steps for installing a support using the construction robot 10 described above will now be explained.

First, the manipulator 12 moves the support installing unit 14 near a support holding position in a material storage, for example, and the support holding position is detected using the camera 16 and the laser distance sensor 18.

The support holding unit 26 is then opened, and the manipulator 12 is caused to move the support installing unit 14 to the support holding position by approaching the support S from immediately above. After the rotor 52 is brought into contact with the support S, and the sliding poles 38 are moved by a certain length, the support holding unit 26 is closed to hold the support S.

The manipulator 12 is then caused to move the support S to an adhesive applying unit, and the laser distance sensor 18 is caused to recognize the height position of the liquid surface of the adhesive. By moving the support S to the height position, the adhesive is applied to the lower surface of the base plate S1 of the support S.

The manipulator 12 is then caused to move the support S near a support installation position, and the camera 16 is caused to detect the reference marking of the support installation position, the reference marking having been provided in advance, and the laser distance sensor 18 is caused to recognize the floor level.

The manipulator 12 is then caused to move the support S to the support installation position, and causes the base plate S1 of the support S to land on the floor F, as illustrated in FIG. 2. The support holding unit 26 is then opened, as illustrated in FIG. 3. In this manner, it is possible to install the support S on the floor F.

The rotating laser level light receiver 36 is then caused to detect the laser beam from the rotating laser level, not illustrated, installed in the construction site, and the support height H is recognized using the detected laser beam as a reference. The support height H is then adjusted to the preset support installation height, by driving the support rotating servo motor 44, and causing the rotor 52 to rotate the support S about the screw shaft S2, as illustrated in FIG. 4. Illustrated in FIG. 4 is an example in which the support height H is lowered. To elevate, the support S is rotated in a reverse direction.

In the manner described above, by installing the support S using the construction robot 10, it is possible to install the support S on the floor F and to adjust the support height H simultaneously. In this manner, it is possible to carry out the installation efficiently.

Explained above in the embodiment is an example in which the construction robot is used in installing a support of a double floor such as a raised floor, but applications of the construction robot according to the present invention are not limited thereto, and the construction robot may be used in any construction work for mounting a member with a changeable height on a body at a predetermined height.

As described above, regarding the construction robot according to the present invention, the construction robot is a construction robot used for mounting a member with a changeable height on a body at a predetermined height, the construction robot including: a manipulator, an end effector that is provided to a distal end of the manipulator, a recognizing unit that recognizes positions of the member and the body, and a measuring unit that measures a positional relation between the member and the body, in which the end effector includes a holding unit that holds the member in a releasable manner, and the height adjusting unit that adjusts a height of the member by moving the member having been brought into contact with the body in a direction moving closer to or in a direction moving away from the body. Thus, it is possible to install the member such as a support and to adjust the height of the member simultaneously.

Furthermore, regarding another construction robot according to the present invention, the member is a support including a screw shaft that is positioned on a side of the body, and a seat that is screwed onto the screw shaft and is movable in a direction along the screw shaft, and the height adjusting unit adjusts a height of the support by rotating the seat of the support about the screw shaft. Thus, it is possible to install the support and to adjust the height of the support simultaneously.

Furthermore, regarding another construction robot according to the present invention, the height adjusting unit includes a sliding mechanism that is provided slidably along an axial direction with respect to the holding unit, a rotating mechanism that is movable integrally with the sliding mechanism and configured to rotate the seat of the support, and a recognizing mechanism that is movable integrally with the sliding mechanism and that recognizes the height of the support, and the height adjusting unit adjusts the height of the support by rotating the seat of the support based on the height recognized by the recognizing mechanism. Thus, it is possible to install the support and to adjust the height of the support simultaneously, so that it is possible to carry out the installation efficiently.

INDUSTRIAL APPLICABILITY

As described above, the construction robot according to the present invention is useful as a construction robot for achieving labor and manpower saving in a construction work, and is particularly suitable for efficiently installing a support in the construction of a double floor.

REFERENCE SIGNS LIST 10 construction robot
12 manipulator 14 support installing unit (end effector)
16 camera (recognizing unit)
18 laser distance sensor (measuring unit)
20 base portion
22 sensor base
24 support holding cylinder
26 support holding unit (holding unit)
28 support height adjusting unit (height adjusting unit)
30 distal end flange
32 sliding mechanism
34 support rotating mechanism
36 rotating laser level light receiver
38 sliding pole
40 coil spring
42 height adjustment plate
44 support rotating servo motor
46 belt
48, 50 pulley
52 rotor
C axial direction
F floor (body)
H support height
S support (member)
S1 base plate
S2 screw shaft
S3 seat

The invention claimed is:

1. A construction robot comprising:
a manipulator;
an end effector provided at a distal end of the manipulator;
a camera to recognize positions of a member and a floor, the member being mounted with a changeable height on the floor at a predetermined height; and
a sensor to measure a positional relation between the member and the floor,
wherein the end effector includes:
    a holder to hold the member in a releasable manner, and
    a height adjuster to adjust a height of the member by moving the member in contact with the floor in a direction moving closer to or in a direction moving away from the floor,
wherein the member is a support that includes:
    a screw shaft that is arranged on a top surface of the floor, and
    a seat that is screwed onto the screw shaft, the seat moving in a direction along the screw shaft, and
wherein the height adjuster adjusts a height of the support by rotating the seat of the support about the screw shaft.

2. The construction robot according to claim 1, wherein the height adjuster includes:
a sliding mechanism provided slidably along an axial direction with respect to the holder;
a rotating mechanism that moves integrally with the sliding mechanism and rotates the seat of the support; and
a height detector that moves integrally with the sliding mechanism and detects the height of the support,
wherein the height adjuster adjusts the height of the support by rotating the seat of the support based on the height detected by the height detector.

3. The construction robot according to claim 2, wherein the height detector is a rotating laser level light receiver that receives a laser beam from a rotating laser level installed in a construction site, and detects the height of the support in real-time, based on the laser beam.

4. The construction robot according to claim 2, wherein the end effector further includes a support holding cylinder that is provided on a distal end flange of a base portion of the end effector, the support holding cylinder including a cylinder that is extendable and contractible in a direction perpendicular to an axial direction of the end effector.

5. The construction robot according to claim 4, wherein the holder includes L-shaped members extending from respective ends of the support holding cylinder toward the distal end side in the axial direction of the end effector and bending inwards, in a front view,
the holder holds the support by contracting the support holding cylinder and bending claws of the holder inwards so that the claws of the holder move in directions approaching each other and go under respective edges of the seat of the support, and
the holder releases the support by extending the support holding cylinder so that the claws of the holder move in directions separating from each other and become separated from the respective edges of the seat of the support.

6. The construction robot according to claim 4, wherein the sliding mechanism is provided around the base portion of the end effector, on the distal end flange of the base portion,
the sliding mechanisms includes a sliding pole that is positioned in a manner passing through the distal end flange and in a slidable manner with respect to the distal end flange in the axial direction of the end effector, and a coil spring that is wound around the sliding pole,
the coil spring is positioned between the distal end flange and one end of the sliding pole, and the coil spring is provided in a manner of applying a biasing force in a direction separating the one end of the sliding pole from the distal end flange.

7. The construction robot according to claim 4, wherein the rotating mechanism is provided to a height adjustment plate, and includes a support rotating servo motor, a belt, pullies and a rotor,
an output shaft of the support rotating servo motor is coupled to one of the pullies, and the belt is wound around the pullies,
the other one of the pullies is coupled to the rotor that is provided coaxially with the axial direction of the end effector, and the other one of the pullies is engageable with an end of the seat of the support.

8. The construction robot according to claim 7, wherein the rotating mechanism rotates the seat of the support about the screw shaft via the belt, the pullies, and the rotor, by driving the support rotating servo motor.

9. The construction robot according to claim 2, wherein the member is a support for a double floor and the floor is a base floor.

10. The construction robot according to claim 2, wherein the sensor is a laser distance sensor that measures the positional relation between the member and the floor based on a laser beam.

* * * * *